March 20, 1956  D. M. MORRIS ET AL  2,738,969
SPRING TENSION DEVICE
Filed Aug. 5, 1952

INVENTORS.
David M. Morris
Robert R. Harter
By Paul O. Pippel
Atty

United States Patent Office 2,738,969
Patented Mar. 20, 1956

2,738,969

SPRING TENSION DEVICE

David M. Morris, Richmond, and Robert R. Harter, Fountain City, Ind., assignors to International Harvester Company, a corporation of New Jersey Application August 5, 1952, Serial No. 302,764

3 Claims. (Cl. 267—1)

This invention relates to spring pressure devices and particularly to the type of spring pressure hold-down devices used in connection with agricultural implements and the like. More specifically the invention concerns a novel adjustable spring pressure device for a seed press wheel utilized with a planter.

The principal object of the invention is the provision of a spring pressure device of novel construction adapted particularly for use with agricultural implements.

Another object of the invention is to provide an improved spring pressure assembly for the ground-engaging wheel of an agricultural implement having incorporated therein novel means for adjusting the spring pressure.

Another object of the invention is the provision of a novel spring tension device for an agricultural implement or the like wherein the adjustment is maintained by friction which increases with the tension upon the spring.

A further object of the invention is the provision of a spring tension device for a ground-engaging element of an agricultural implement which is easy to adjust and is simple and efficient in its operation.

The spring tension or pressure device of this invention will be described in its application to a seed firming wheel adapted to travel in the furrow in which the seed is deposited and to press the seed into the soil at the bottom of the furrow to provide a firm bed therefor prior to covering the seed with dirt by means of the conventional covering devices. The amount of pressure, of course, varies with the character of the soil, its moisture content and the seed deposited. With the device of this invention variations in the pressure applied by the seed firming wheel are readily made.

Figure 1:
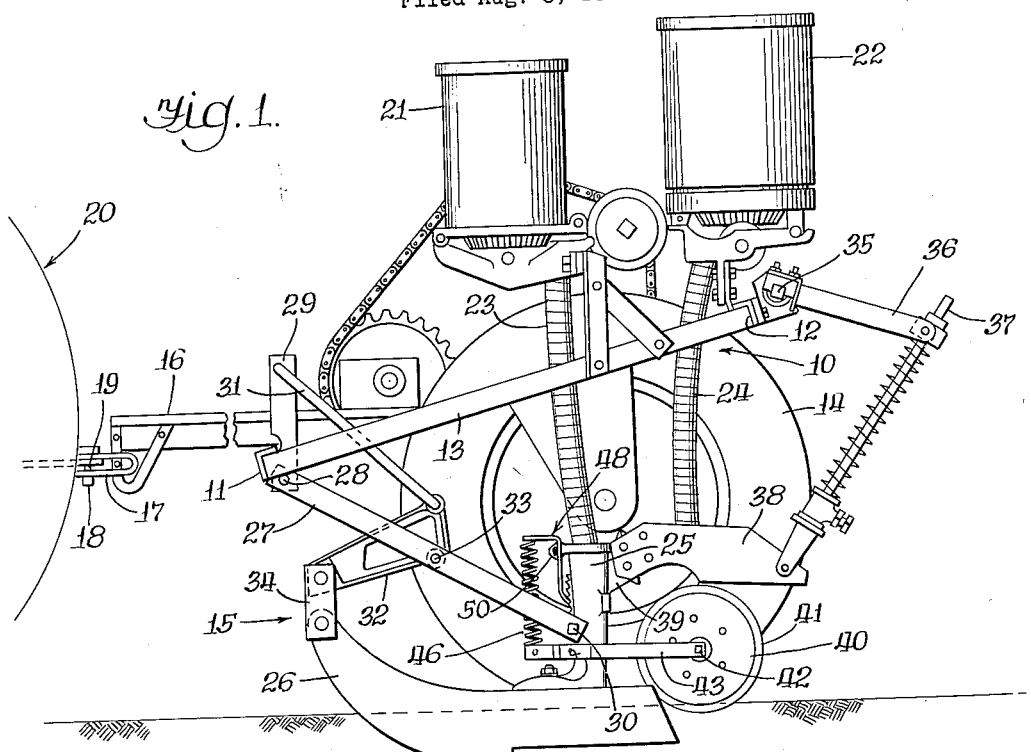
Figure 2:
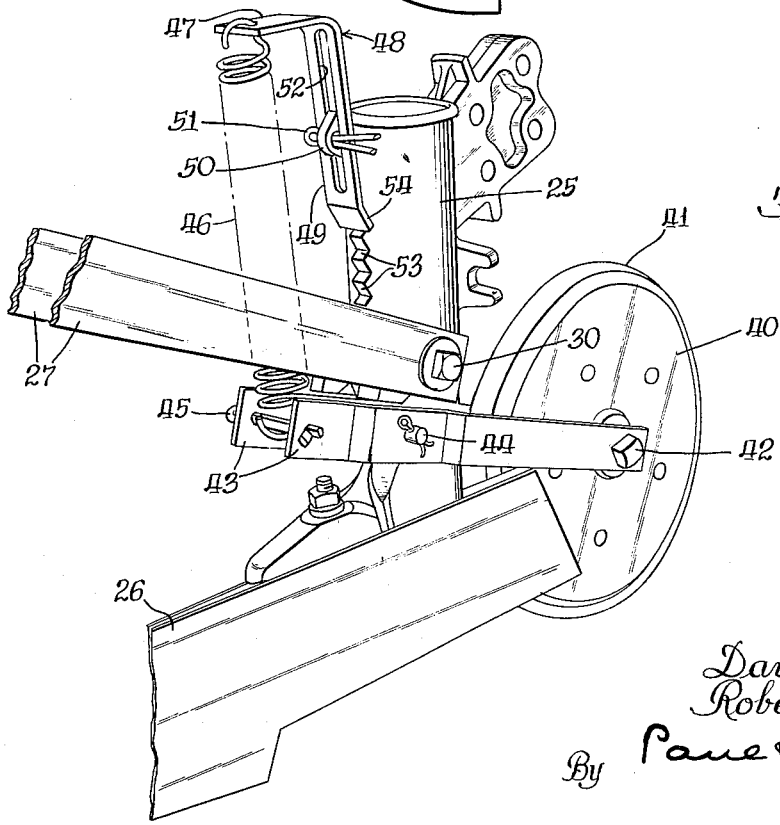

Other objects and advantages of the invention will become clear from the following detailed description when read in conjunction with the accompanying drawings, wherein:

Fig. 1 is a view in side elevation of a planter drawn by a tractor and incorporating the features of this invention; and Fig. 2 is a perspective view, enlarged, of a detail of the mechanism shown in Fig. 1 and illustrating the application of the spring tension or spring pressure device of this invention to a seed firming wheel.

The numeral 10 designates generally the frame of a planter incorporating therein the features of this invention. The planter frame is generally rectangular, extending transversely of the direction of travel and comprises, generally, front and rear frame angle bars 11 and 12, respectively, and end bars 13, only one of which is shown. The general construction of the planter is conventional and it may be understood that the frame 10 is supported by one or more ground-engaging wheels 14 and that at laterally spaced locations on the frame a plurality of planter units generally designated by the numeral 15 are provided. Since these units are substantial duplicates a description of one will suffice.

Briefly, the planter frame also includes a forwardly extending hitch frame 16 provided at its forward end with a clevis 17 connected by a pivot pin 18 with the drawbar 19 of a tractor, a portion of one wheel of which is shown and which is designated by the numeral 20.

In the type of planter shown in the drawings the frame 10 has mounted thereupon for each unit 15 a seed box 21 and a fertilizer box 22, seed and fertilizer being dispensed respectively through flexible hoses 23 and 24.

Seed tube 23 is received in a seed boot 25 which serves as a supporting standard and has secured to its lower end a furrow opener 26 of the runner type adapted to penetrate the soil and form a furrow therein for the deposition of seed from the box 21.

The planter unit 15 is connected to the frame 10 by supporting mechanism described in copending application, Serial No. 213,353, filed March 1, 1951, now Patent No. 2,694,356, granted November 16, 1954, in the name of Clarence C. Haas, and includes a pair of draft links 27 pivotally connected at 28 to a bracket 29 mounted upon the front frame bar 11 of the planter. Links 27 extend downwardly and rearwardly and are pivotally connected at their rear ends to a pivot bolt 30 carried by the seed boot 25 so that the planter unit 15 is capable of vertical floating movement about the pivot 28 of links 27 on the frame. Maintaining the furrow opening assembly level during vertical movement thereof is facilitated by the provision of another link 31 which is pivoted to the upper end of the bracket 29 and at its rear end is pivotally connected to an arm of a bell crank 32 which is fulcrumed at 33 upon the links 27. The other arm of the bell crank is pivotally connected to one end of a link 34, the other end of which is connected to the upwardly curved end of the runner 26.

The mechanism by which the furrow opening assembly is vertically moved between operating and transport positions forms no part of this invention. It may be noted, however, that lifting is accomplished through a rockshaft 35 mounted upon the rear frame bar 12 and having secured thereto a rock arm 36 which is connected by a lift rod 37 of conventional form to a plate 38 affixed to a lug 39 integral with and extending rearwardly from seed boot 25. Rocking of the shaft 35, therefore, acts through arm 36 and rod 37 to lift the furrow opener unit.

Directly behind the furrow opener 26 and arranged to ride in the furrow is a so-called seed firming wheel 40 having a tire 41 preferably in the form of a rubber tube. Wheel axle 42 has mounted at opposite ends thereof laterally spaced straps 43 which extend forwardly and are pivotally mounted upon a pin 44 extending transversely through a suitable boss provided on the seed boot 25. These straps 43 are pivoted on the pin 44 medially of their ends and the forwardly projecting ends thereof are apertured to receive a cotter key 45 which serves for the attachment thereto of a generally vertically extending tension spring 46, the upper end of which is anchored to the horizontal arm 47 of an angle bracket 48, the other arm 49 of which extends generally parallel to the spring 46 and to the seed boot body 25. A fulcrum or pivot means for the bracket 48 is provided in the form of a lug 50 integral with and extending forwardly from the upper end of the boot 25 and apertured to receive a cotter key 51.

As shown particularly well in Fig. 2 the lug 50 is slidably receivable in an elongated vertical slot 52 provided in the arm 49 of the bracket 48 and is maintained in the slot by the cotter key 51. As shown in the drawings the fulcrum of the bracket 48 is maintained by engagement of the bracket with serrations 53 and the action of the spring 46. The pressure of the wheel 40 on the ground maintains tension upon the spring 46 and this tension is increased by any upward movement of the firming wheel relative to the furrow opener. The action of the spring 46 upon the lever arm represented by the distance between the fulcrum 51 and the end of the arm 47 of the bracket 48 tends to press the end of arm 49 of the bracket beyond the fulcrum against the forward face of the seed boot 25. The greater the tension upon the spring 46, of course, the greater the frictional engagement of the arm 49 with the surface of the seed boot.

The forward face of the seed boot 25, as clearly shown in the drawings, is provided with serrations 53 which are vertically spaced and form teeth for the reception of the bent end 54 of the bracket arm 49. The ease and efficiency with which tension adjustments upon the spring 46 and the wheel 40 may be made should be readily visualized. It should also be clear that there has been provided a novel pivot bracket construction wherein the fulcrum may be varied with respect to the bracket in order to change the effective lengths of the bracket arms. To change the tension upon the spring 46 an operator simply grasps the bracket 48 and slides it up or down until the end 54 of the arm 49 engages a selected stop in the form of one of the teeth 53.

The operation of the novel spring tension device of this invention should be clearly understood from the foregoing description. It should also be understood that the invention has been described in its preferred embodiment and that modifications may be made therein without departing from the spirit of the invention or the scope of the appended claims.

What is claimed is:

1. A spring tension device for a ground-engaging member adapted for attachment to an agricultural implement or the like having a generally vertically extending supporting member, said device comprising an angle bracket having a vertical arm generally parallel to and adjacent said support and an upper horizontal arm affixed to the upper end of said vertical arm and extending outwardly from the support, fulcrum means pivotally mounting said vertical arm on the support for rocking of said bracket about the axis of said fulcrum means to move the lower end of the vertical arm toward and away from the support, a spring extending generally vertically operatively connected at its lower end to said ground-engaging member and at its upper end to said horizontal arm, said spring being effective to rock the angle bracket in a direction to urge the lower end of said vertical arm into engagement with the support, means on the support operative with said angle bracket to hold the latter against vertical movement relative to the support, said bracket being vertically adjustable to selected positions relative to said fulcrum means to vary the tension on the spring.

2. The invention set forth in claim 1, wherein said vertical arm is spaced from the support and its lower end is bent toward the support and vertically spaced serrations are provided on the support for selective reception and retention of the bent end of said vertical arm upon adjusting the bracket vertically to vary the tension on the spring.

3. The invention set forth in claim 1, wherein said vertical arm is provided with a vertical slot to slidably receive part of said fulcrum means to accommodate the vertical adjustment of the bracket.

References Cited in the file of this patent

UNITED STATES PATENTS

| | | |
|---|---|---|
| 492,009 | Grafunder | Feb. 21, 1893 |
| 621,856 | Schwarz | Mar. 28, 1899 |
| 707,941 | Pope | Aug. 26, 1902 |
| 1,179,579 | Taylor | Apr. 18, 1916 |
| 1,264,837 | Moen | Apr. 30, 1918 |
| 1,340,581 | Van Brunt | May 18, 1920 |
| 1,411,897 | Aspinwall | Apr. 4, 1922 |
| 1,506,820 | Erdman et al. | Sept. 2, 1924 |
| 1,831,576 | Petersen | Nov. 10, 1931 |